Aug. 6, 1929.  R. B. FAGEOL  1,723,774
BUMPER
Filed April 27, 1927  2 Sheets-Sheet 1

INVENTOR
Rollie B. Fageol
BY
Frederick S. Duncan
ATTORNEY

Aug. 6, 1929.  R. B. FAGEOL  1,723,774
BUMPER
Filed April 27, 1927  2 Sheets-Sheet 2
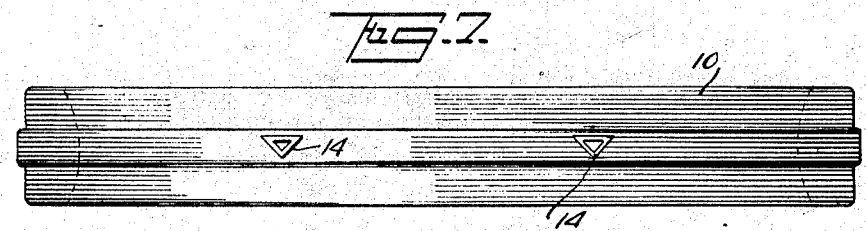
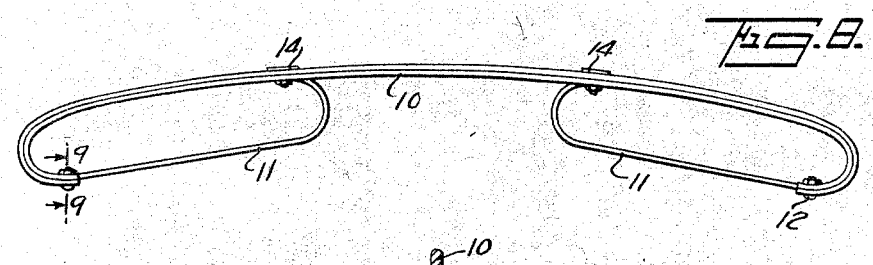
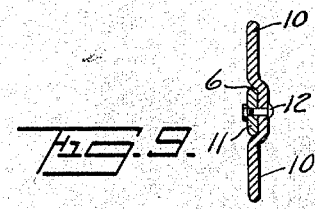
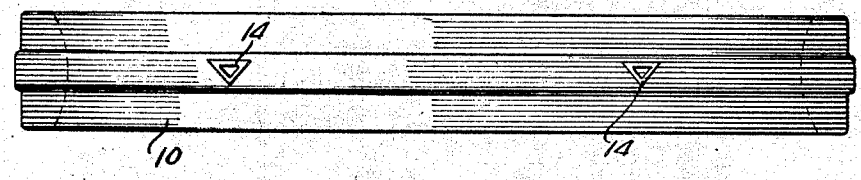
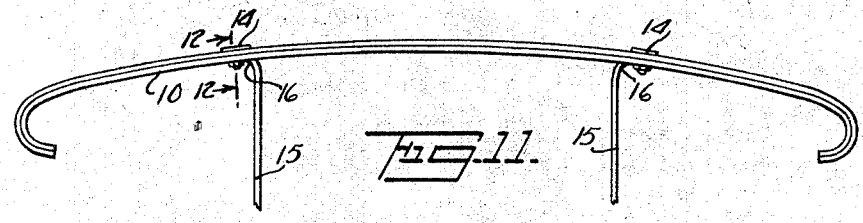
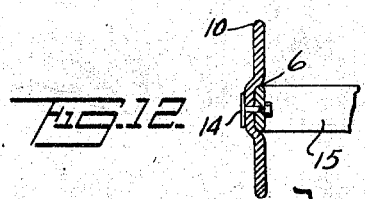
INVENTOR
Rollie B. Fageol.
BY
Frederick P. Duncan, ATTORNEY Patented Aug. 6, 1929.

1,723,774

UNITED STATES PATENT OFFICE.

ROLLIE B. FAGEOL, OF LOS ANGELES, CALIFORNIA, ASSIGNOR TO AMERICAN CHAIN CO., A CORPORATION OF NEW YORK.

BUMPER.

Application filed April 27, 1927. Serial No. 186,846.

This invention relates to an automobile bumper and more particularly to a type of bumper having an impact bar of considerable width formed to give the appearance of a multi-bar bumper.

As is well known in the art, it has been the practice heretofore to secure the end of the attaching bar or bars and the impact section of a bumper together by means of a clamp or plurality of bolts. It is the principal object of this invention to provide an impact bar with a longitudinal channeled groove therein to facilitate the alignment and attachment of the attaching bar to the impact section by the use of one bolt, thereby lessening the number of parts.

Another object is to provide a bumper formed of relatively thin material which may be rolled into the desired shape inexpensively and permit expeditious assembly of the parts and be pleasing to the eye.

A clear conception of the construction and further objects of the invention may be had from the following specification in conjunction with the accompanying drawings in which Fig. 1 discloses the invention in front elevation.

Fig. 7 discloses a modified form of attachment for the rear bar.

Fig. 8 is a plan view of Fig. 7.

Fig. 9 is a cross-section through 9—9 of Fig. 8.

Fig. 10 discloses a further modified method of securing the rear bar.

Fig. 11 is a plan view of Fig. 10; and

Fig. 12 is a cross-section through 12—12 of Fig. 11.

Figure 1:
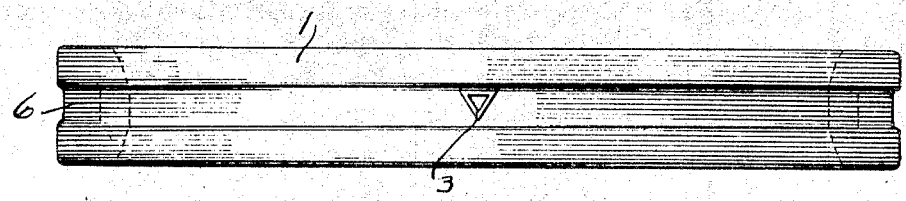
Figure 2:
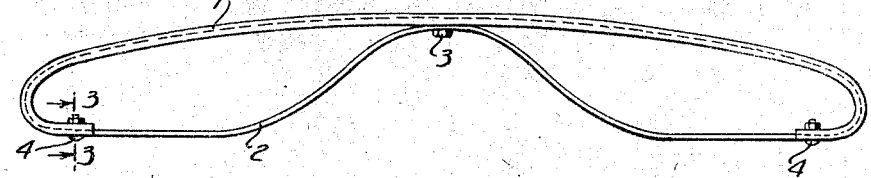
Fig. 2 is a plan view of Fig. 1.
Figure 3:
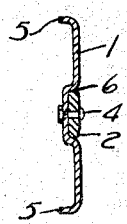
Fig. 3 is a cross-section through 3—3 of Fig. 2.

The now preferred form of invention as shown in Figs. 1 and 2 comprises an impact member 1 and a rear or attaching bar 2. The rear bar is formed as shown with its center portion drawn forward and secured to the impact member 1 by an emblem-headed bolt 3. The ends of bar 2 are secured to the ends of impact bar 1 by bolts 4. The impact bar 1 is preferably formed of relatively thin strip steel, which is rolled in the shape as shown in Fig. 3, having flanges 5 at the top and bottom and a longitudinal groove 6 extending along the middle of the bar. The grooved portion 6 is preferably left unfinished except for a coating of enamel while the two remaining faces of the bar are ground and nickeled or finished in any desired manner. The impact member is formed with loop ends as shown, thereby bringing the groove 6 to the rear of the bumper. The rear bar 2 is of a width equal to the groove 6 and fixed therein and is held by a bolt such as 4. Due to the fact that the bar 2 is heated in the groove 6 for a considerable portion and fits snugly therein, it is held in horizontal alignment with the impact bar without the necessity of using clamps, thereby giving fewer parts to be assembled. The bolt 3 has a flat emblematic head which, due to its shape and size, is seated in the recess 6 and is held by the edges of the recess from turning. It is of such a thickness that it lies in back of the plane of the face of the impact bar, thereby forming a bumper face without the usual protruding clamps and fixtures.

Figure 4:
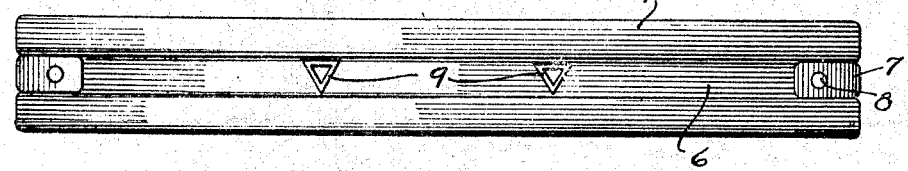
Fig. 4 is a modified form of the invention in front elevation.
Figure 5:
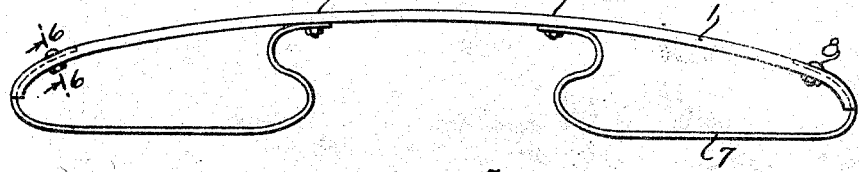
Fig. 5 is a plan view of Fig. 4.
Figure 6:
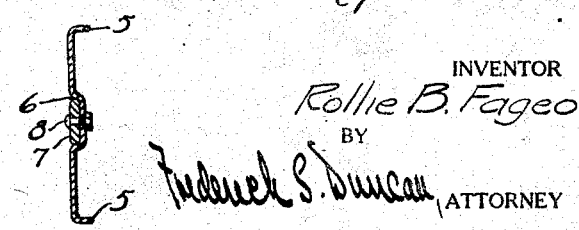
Fig. 6 is a cross-section through 6—6 of Fig. 5.

The bumper disclosed in Fig. 4 is a modified method for securing the impact member 1 to the attaching bars. As the impact member in this type of bumper is the same as that described above, the same designating numerals will be used to simplify the description. The material difference lies in the shape of the attaching bar 7, which is shown in two separate units, having their outer ends looped to pass around the ends of the impact member and lie in groove 6. The end of the bar 7 is secured to the impact section by means of a bolt 8 and is held in horizontal alignment by means of the edges of the groove 6, into which it is snugly seated as shown in Fig. 5. The inner end of bars 7 are S-shape in form and have their ends secured to the rear of the impact section by emblematic bolts such as 9. It is obvious that this type of bumper will be easy to manufacture and assemble.

A further modification of this type of bumper and the method of securing the rear bar thereto is shown in Fig. 7. In this type bumper the groove 6 is formed in the rear of the impact bar 10 and the flanges 5 are preferably omitted. It is obvious, however, that the flanges may be used without departing from the spirit of the invention. In this form of bumper the groove 6 forms a shoulder on the front of the bar which is ground and nickeled while the remainder of the bar is enameled. The attaching bars 11 are in separate units as shown in Fig. 8 having their outer ends secured in the groove 6, which is on the inside of the impact member, by means of bolts 12. The other ends of the bars 11 are also secured in the groove 6, at points intermediate of its ends, by headed bolts 14. As in the other types described above the groove 6 holds the attaching bar securely in horizontal alignment with the impact bar 10 as shown in Fig. 9.

A still further modified form of the invention is shown in Fig. 10. The impact bar shown in this figure is similar to that described above and shown in Fig. 7; therefore, the same designating numerals will be used to simplify the description. The attaching bars 15 are straight strips of spring steel set on edge with their ends bent to form an angle portion 16 which fits into the groove 6 in the rear of the impact member 10 as shown in Fig. 11. The angle portion 16 is secured by bolts 14 and is held in horizontal alignment with the impact member by means of the edges of recess 6 as shown in Fig. 12.

It is apparent from the above description that this type of bumper will allow for expeditious assembly and will do away with the use of clamps for rigidly aligning the attaching bars with respect to the impact members or member of a bumper.

It is also apparent that this type of bumper will present a pleasing effect to the eye.

I claim:

1. In a bumper of the type described, an impact bar having a longitudinal recess formed in one face thereof, said recess permitting the attachment and alignment of a rear supporting bar thereto by means of one bolt at each point of attachment, said bar having a longitudinal protuberance on the other face thereof corresponding in location to said recess.

2. In a bumper of the type described an impact bar having a medial longitudinal groove formed in one face thereof, a rear supporting bar having a portion shaped to conform with a portion of said impact bar, said rear supporting bar portion being of a width sufficient to snugly fit said groove and a bolt for securing said portion of said rear supporting bar to said impact bar in rigid horizontal alignment, said bar having a longitudinal protuberance on the other face thereof corresponding in location to said groove.

3. In a bumper of the type described an impact bar having looped ends thereon, said impact bar having a longitudinal groove formed in the middle thereof, a rear bar having its center portion bent forward and secured to the rear of said impact bar, the ends of said rear bar fitting snugly into the groove in said impact bar and being secured in rigid horizontal alignment therewith at each end by a bolt.

4. In a bumper of the type described, an impact bar having a longitudinal recess formed in the impact face, said recess permitting the attachment and alignment of a rear bar in said recess by one bolt at each point of attachment.

5. In a bumper of the type described, an impact bar having looped ends thereon, said impact bar having a longitudinal groove formed in the impact face thereof, a rear bar having its ends secured in said groove in rigid horizontal alignment therewith at each end by a bolt.

In testimony whereof, I have signed this specification.

ROLLIE B. FAGEOL.